United States Patent
Koong et al.

(10) Patent No.: US 6,442,000 B1
(45) Date of Patent: Aug. 27, 2002

(54) LOW COST FLEXIBLE SUPPORT ACTUATOR

(75) Inventors: See Jee Johaan Koong; Michael Joo Chiang Toh; Choon Kiat Lim; Wai Onn Chee; Kevin Arthur Gomez, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/420,254

(22) Filed: Oct. 18, 1999

Related U.S. Application Data

(60) Provisional application No. 60/109,027, filed on Nov. 18, 1998.

(51) Int. Cl.⁷ .................................................. G11B 5/54
(52) U.S. Cl. .................................................. 360/256.4
(58) Field of Search ........................... 360/256.4, 256.3, 360/98.07, 99.08, 256–256.6

(56) References Cited

U.S. PATENT DOCUMENTS

| | | |
|---|---|---|
| 4,745,504 A | 5/1988 | Foote |
| 4,997,123 A | 3/1991 | Backus et al. |
| 5,432,663 A | 7/1995 | Ichihara |
| 5,504,641 A | 4/1996 | Diel |
| 5,555,146 A * | 9/1996 | Hickox et al. ........... 360/256.4 |
| 5,559,652 A | 9/1996 | Heath et al. |
| 5,680,276 A | 10/1997 | Takekado |
| 5,761,006 A | 6/1998 | Sri-Jayantha et al. |

* cited by examiner

*Primary Examiner*—Allen Cao
(74) *Attorney, Agent, or Firm*—Derek J. Berger; Shawn B. Dempster

(57) ABSTRACT

An actuator and a method for using an actuator in a disc drive having a limited range of rotation wherein an actuator arm for providing motion for reading or writing data to or from media engages a shaft or post fixed within the actuator arm for communicating with the actuator arm by means of clips affixed to the shaft. The clips have flexible wings affixed to the actuator arm whereby the shaft and the actuator arm are held in a fixed relationship allowing the arm to rotate with respect to the shaft while movement between the actuator arm and the shaft other than by rotation is prevented by the shape of the flexible wings.

18 Claims, 6 Drawing Sheets

LOW COST FLEXIBLE SUPPORT ACTUATOR

CROSS REFERENCE TO RELATED APPLICATIONS

This application claims priority to Provisional Patent Application Ser. No. 60/109,027 filed Nov. 18, 1998.

FIELD OF THE INVENTION

This invention relates to actuators for storage media, and particularly to read-write actuators for flat media such as magnetic disks, optical disks, and compact disks.

BACKGROUND

Disk drives and similar flat media, such as compact disks, etc., use a displaceable read head or read/write head for sensing data on the media. The displacement required is normally on the order of plus or minus 15 degrees, but can be more or less. The head is mounted on an arm which is rotatably disposed from a fixed shaft on a stationary base, thereby allowing limited rotation of the arm. The head is required to travel from the inside diameter of the disc where the innermost data resides (ID) to the outside diameter of the disc where the outermost data resides (OD) of the flat media; and the arm must move quickly with respect to the shaft in response to an input from an actuator. To obtain high speed with minimum energy, the connection from shaft to arm must allow the arm to rotate freely about a limited arc, but at the same time, changes in the arm axial orientation, called rocking, excessive arm rotation, called overswing, and vertical movement, called jumping, must be suppressed.

The above requirement for limited rotation in an actuator arm requires that there be enough resistance to motion to reduce undesired movements, such as overswing, without unduly inhibiting rotational movement. The desired resistance to excessive rotational motion is referred to herein and generally as damping. Additionally, there must be sufficient constraint in the vertical direction to movement, that is, motion parallel to the shaft axis, to prevent lifting or dropping of the arm and head, which is defined herein as jumping. Further, the actuator must retain these qualities over a relatively long lifetime, so the mechanism must tolerate wear.

The conventional mechanism provides ball bearings in spaced races around the shaft; with typically two races on the shaft. The two races, when spaced appropriately, reduce or prevent rocking. Locking the races to the shaft and to the arm, such as by the use of shoulders on the race holders or by adhesion or fastening, prevents movement parallel to the axis of the shaft, and the friction of the ball bearings in the two races provide sufficient damping. Because there is no inherent limit to the rotation allowed by the ball bearings, crash stops are included to prevent overswing, defined as rotation tending to cause the arm to take the head beyond a range defined as the space between the ID and OD discussed above.

However, the solution of the prior art is expensive and relatively subject to damage. Further, there is insufficient constraint on overswing, so damping is critical and crash blocks are required. Wear can also be a problem; for example, even a small amount of wear on the bearing races can cause rocking and jumping.

It is desired to find a solution to these and other problems with the prior art. The present design accomplishes these purposes and other desirable purposes while reducing cost and increasing reliability.

SUMMARY OF THE INVENTION

Clips, which as used herein define small, thin shear panels, with ends formed at an angle to the body of the clip whereby the clips form an open U shape, also referred to as wings. The clips are formed of flat, relatively thin pieces of a material such as spring steel, etc. This type of clip is extremely resistant to movement in the plane of the panel of material from which the clip is formed; that is, to shear forces. If the material of the panel is thin, it is very easily deformed in a direction perpendicular to the plane of the clip; that is, bending stresses normal to the shear forces. If several wings of the clips are dispersed radially around a shaft; for example, in two or more equally spaced locations, the damping, or resistance to deformation, can be made uniform around the shaft. In this way, the actuator arm can be made to rotate freely for a limited distance, with the distance being limited by deformation perpendicular to the plane of the wings of the clips, into a position where further deformation increasingly requires deformation parallel to the plane of the wings of the clips. As discussed, the wings of the clips of this embodiment of the invention are highly resistant to deformation in the plane of the panel of material forming the wings. If wings are spaced as disclosed above, in more than one location along the axis of the shaft, rocking is inhibited, as well as jumping, by resistance to deformation along the plane of the panel forming the clip and wings.

In an alternative embodiment, the clips are replaced by wings formed, for example, as part of the arm and also of the shaft, and thereby as an integral single piece. While additional tooling costs would be required, this embodiment would be more amenable to mass production techniques, since arm, shaft and wings all form a single part. Of course, the wings could also be formed as a separate assembly attached to both the arm and the shaft, or as a part of the shaft, etc. Separate clips are often desirable because they can be made of, for example, spring steel, with the arm and shaft made of another material, but with the proper materials, using integral wings could result in an overall lower cost. Other benefits of using integral wings instead of separate clips will be obvious to those using the invention.

It will be appreciated also that at or near the limits of maximum rotation the wings of the clips will have distorted from a position substantially radial to the center of the shaft to a position substantially tangent to the shaft circumference. This places the wings of the clips into a nearly planar stress, whereby maximum force is exerted. Thereby damping, due to resistance to deformation along a plane and optionally due to interference between the wings and the optional crash blocks, is also maximized. This not only reduces problems in damping, but with carefully designed wings may also allow the elimination of crash stops, which are stopping blocks formed in the arms and causing interference between the wings of the clips and the arms. A relatively long panel or wing parallel to the shaft axis will further resist jumping and rocking due to the resistance of the clip to deformation in the plane of the panels making up the wings. When made of an extremely elastic material like spring steel, wings of this embodiment of the invention are extremely resistant to wear, and provide very long lifetimes.

In the invention, a multiplicity of wings are disposed about a shaft for rotatably disposing a head or similar actuated device around a limited arc of rotation. The wings also have sufficient resistance to motion, other than rotation, to provide a stable connection between the shaft and the arm with minimal rocking, jumping, overswing or wear.

DETAILED DESCRIPTION

In the design of actuator arms for disposing a read/write head across flat media, the purpose is to make a mechanism with an action similar to the human elbow. That is, the arm is constrained to dispose in a plane parallel to the plane of the media, and with a limited rotation; often about plus or minus 15 degrees (as opposed to the plus or minus 90 degrees of the human elbow).

To accomplish this, a substantially vertical bore is at an end of the actuator arm, and a shaft is fixed within the bore. Space between the arm and the shaft is provided. In the prior art, the space accommodated rotatable suspension means such as races having bearings. In the invention, the space is used for flexible wings, which provide substantially the same function. Just as with the human elbow, it is important that only movement along a single plane and for a limited arc be allowed, with any other movement for the arm being provided elsewhere.

Figure 1:
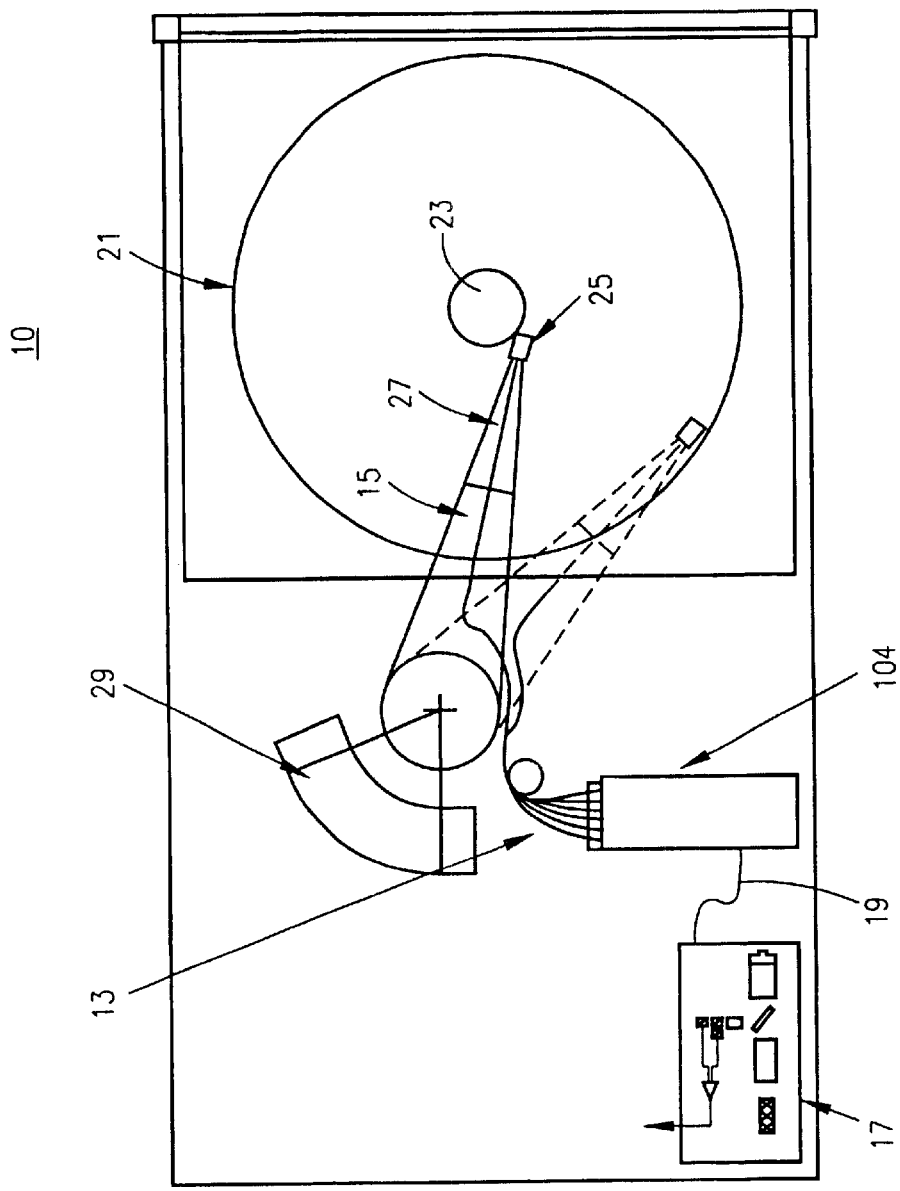
FIG. 1 is a disc drive with an actuator support for the prior art or the invention.

An embodiment of a disc drive 10 which utilizes the prior art and in which the present invention may be utilized is shown in FIG. 1. In this example, wire and fiber optic bundles 13 allow a multiplexor 16 to communicate through flexure 27 and actuator 15 with transducer 25 moving across disc 21 as disc 21 rotates about spindle 23. Actuator 15 is driven by motor 29 and moves transducer 25 from the inner diameter (ID) of disc 21 to the outer diameter (OD) of disc 21. Multiplexor 16 also communicates with a read/write drive module 17 through connection 19. It is apparent that actuator 15 forms a crucial part of disc drive 10 and enables reading and writing to disc 21.

Figure 2:
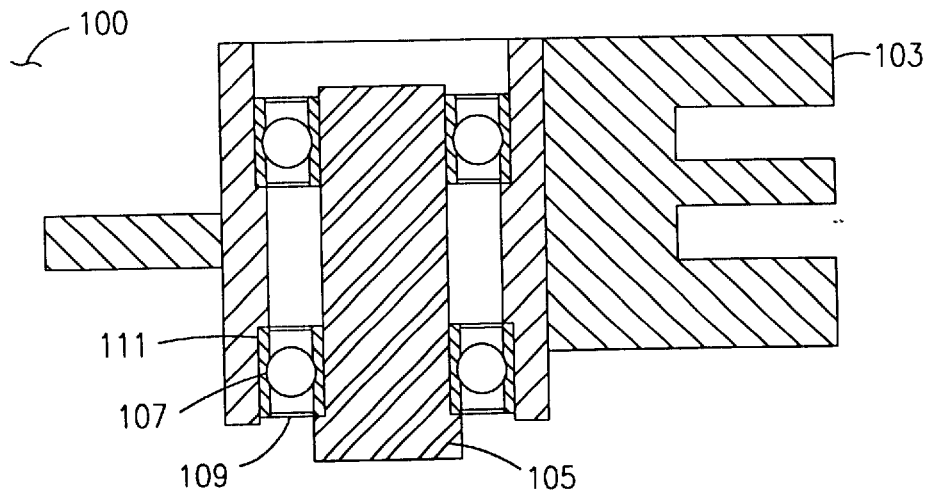
FIG. 2 is an actuator support of the prior art.

The embodiment of an actuator support of FIG. 2 100 is an embodiment of the prior art in which an actuator arm 103 is rotated around a fixed shaft 105 using ball bearings 107 in races 109. Tight tolerances, and recesses at appropriate places, such as shoulder 111, insure that jumping and rocking are minimized. In this embodiment, the arm 103 is disposed back and forth over the ID to OD region of a disk or similar media by the rotation of arm 103 about shaft 105.

Figure 3:
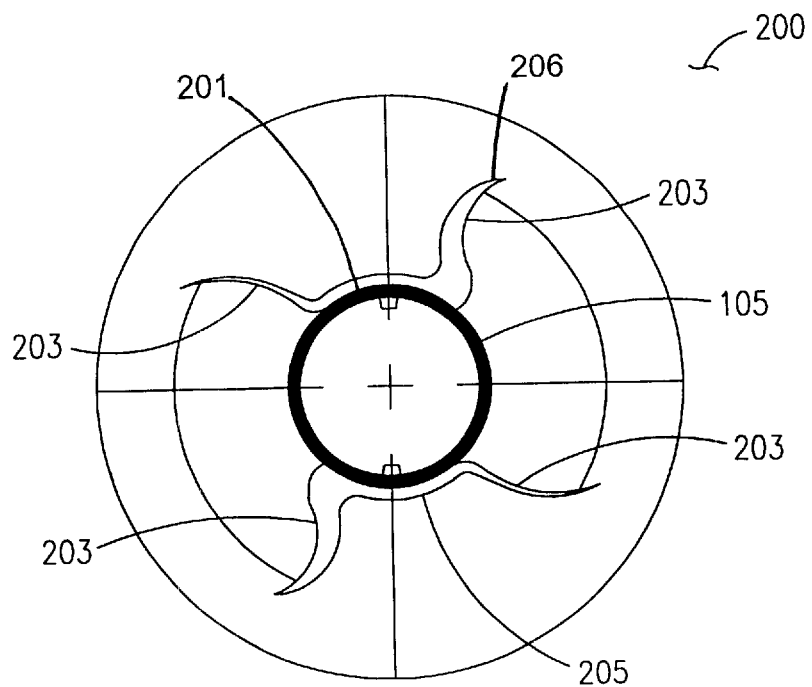
FIG. 3 is an embodiment of the invention showing the wings at an ID position. A stopping feature, also called a crash block, holds or locks them at that position.

According to the present invention, rotation of the arm 103 is enabled by flexible wings 203 of clips 201 in the actuator support connection 200 for an embodiment of an actuator arm of FIG. 3. Here shaft 105 has been modified by replacing the ball bearings 107 and races 109 with flexible wings 203 of clips 201. Stopping block 205 is here shown as a part of the arm and protruding into the space provided for the shaft and wings 203 of clips 201. Stopping block 205 provides a positive stop for the flexure of wings 203 of clips 201. Stopping block 205 is primarily required for the prior art; careful design of the wings 203 of clips 201 can eliminate the need for stopping blocks such as stopping block 205.

Also note that the flexible clip ends are typically molded into the actuator arm. As an alternative, the clip ends may be engageably inserted into slots provided for them, such as in the actuator arm.

Figure 4:
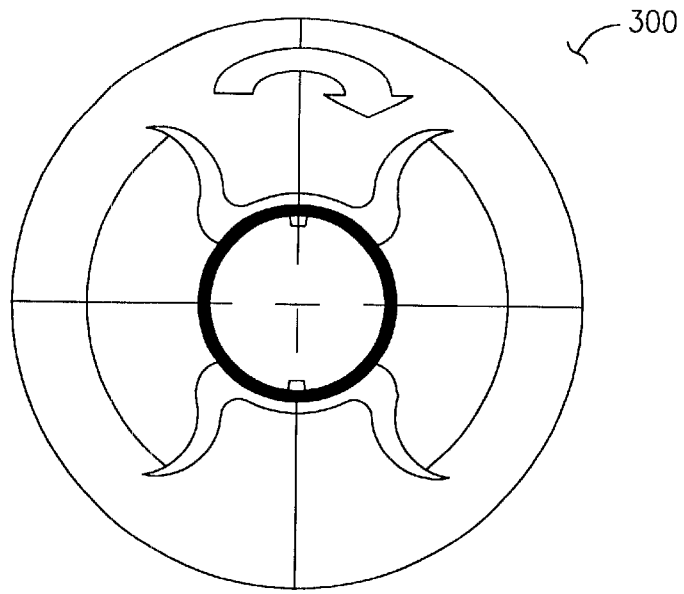
FIG. 4 is an embodiment of the invention showing the wings in a rest or midrange position.

Note that in the middle position as shown in the embodiment 300 of FIG. 4, the flexible wings 203 of clips appear to allow rocking. However, the clip ends are typically molded into the actuator arm, or may be engageably inserted into slots 206 provided for them in the bore in the actuator arm as shown in the figures, and any motion except rotation would put at least one of the wings 203 of clips in a flexure mode in the plane of the clip wing. That is, the wings 203 of clips would attempt to stretch along the plane of the material, and the flexible wings 203 of the clips are very resistive to motion in the plane of the material. It will be noted also that for extreme pressure, such as in a shock, the flexure of the wings 203 would be prevented beyond a limit set by the stopping blocks, and that limit can be set below the limit for permanent damage. Alternatively, if a tough enough material, such as spring steel, is available for the wings of the clips, the clips could resist damaging flexure, and the stopping blocks would not be required. Note that no such inherent limits on motion exist with the prior art bearings, which need stopping blocks.

Figure 5:
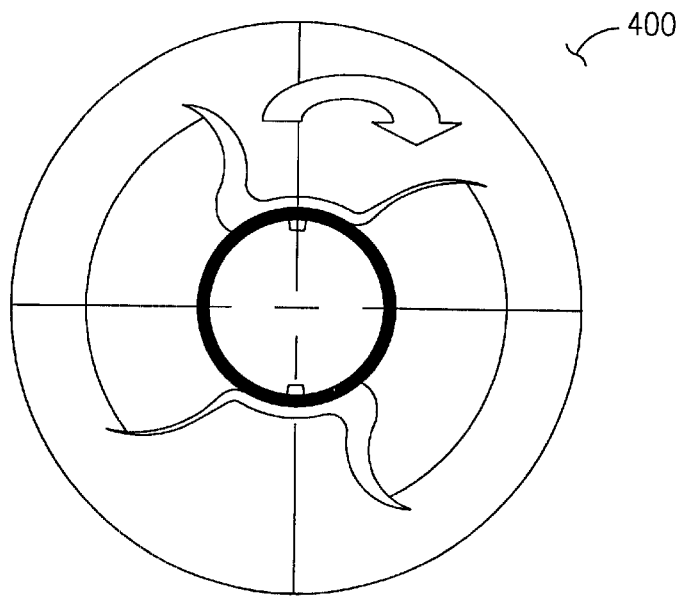
FIG. 5 is an embodiment of the invention showing the wings in a stressed or rotated OD position.

The action of the stopping blocks can be appreciated again in the embodiment 400 of FIG. 5, which is a view of the flexible wings 203 of the clips 201 locking at or near an OD position. Note that if the design put the flexible wings 203 into a more planar stress, the stopping blocks would not be necessary, as disclosed before.

Figure 6:
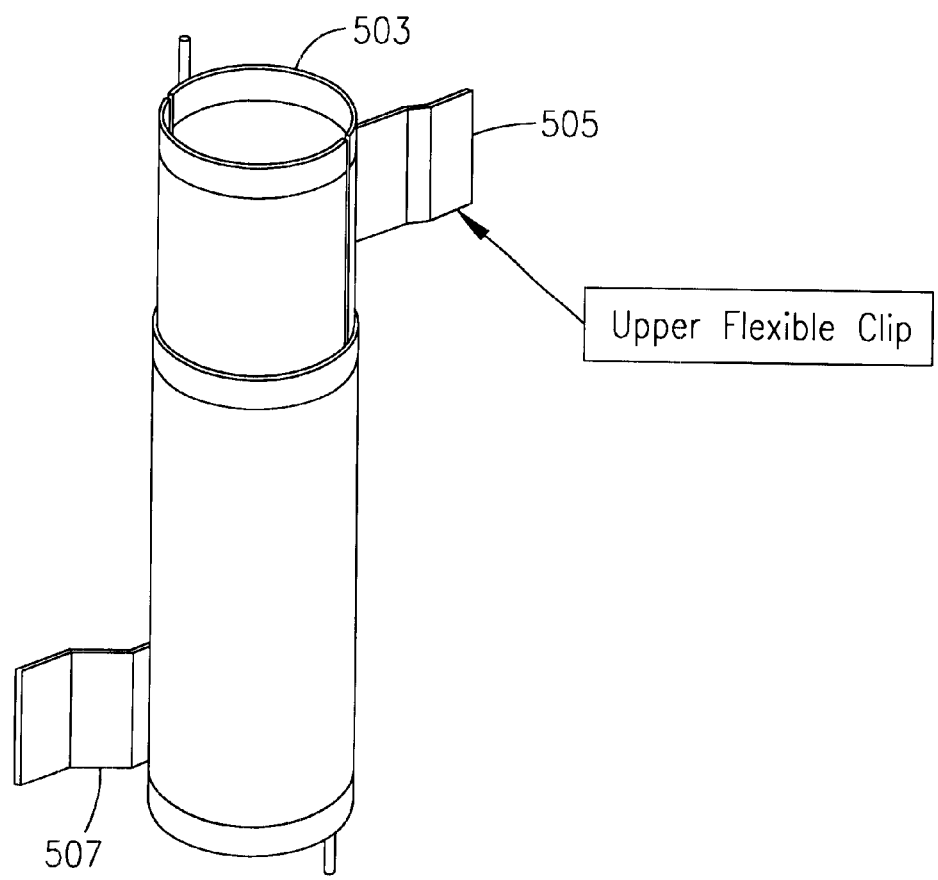
FIG. 6 shows an isometric view of an embodiment of the invention having a main pivot shaft rotating about an inner shaft. The base is not shown, so the wings appear to end without connecting, though they actually connect to the base as shown in other figures.

An isometric view of an embodiment of the invention 500 using only two wings is shown in FIG. 6. The actuator arm 103 including stopping blocks 205 have been omitted for clarity, and a main pivot shaft 503 is shown with an upper wing 505 and a lower wing 507. This arrangement seems unstable until we notice that the tips of the wings are crimped for positive engagement of the slots 206 provided for them in the actuator arms, thereby allowing the flexible wings 203 of the clips 201 to lock to the actuator arm.

Figure 7:
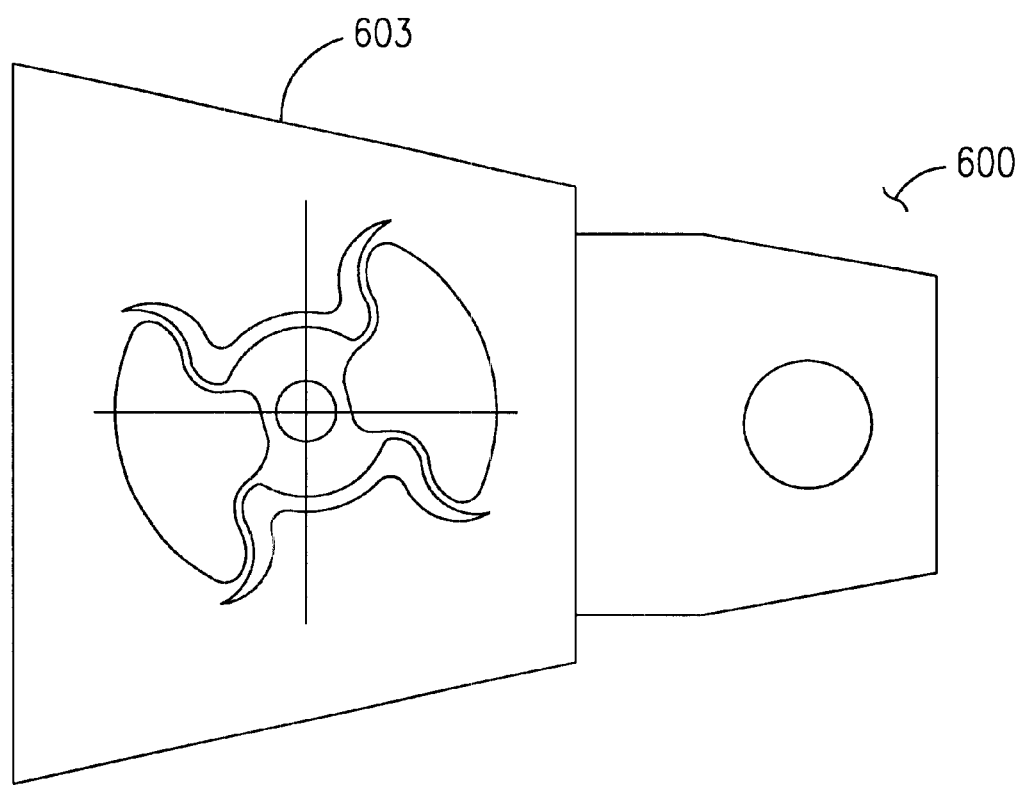
FIG. 7 shows an embodiment of the invention wherein the actuator is at an ID position.
Figure 8:
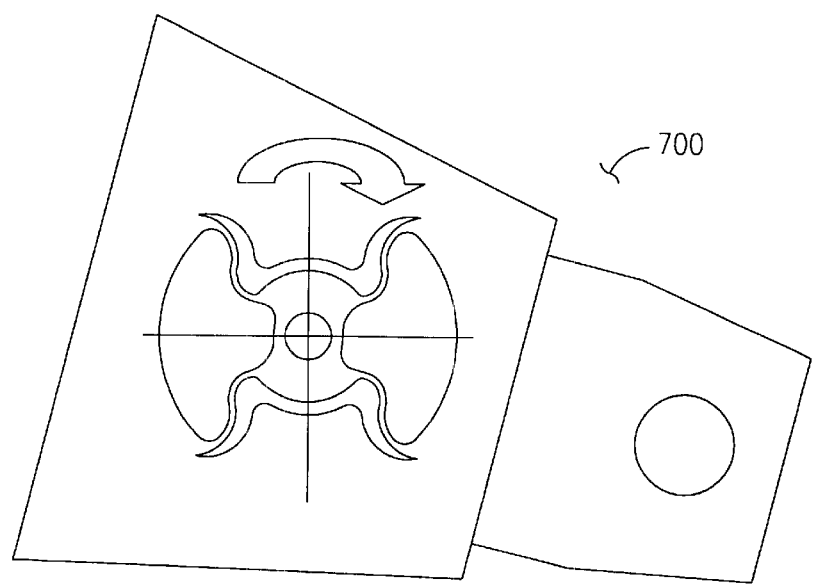
FIG. 8 shows an embodiment of the invention wherein the actuator is at a rest, or mid position, with the wings in a rest position as in FIG. 3.
Figure 9:
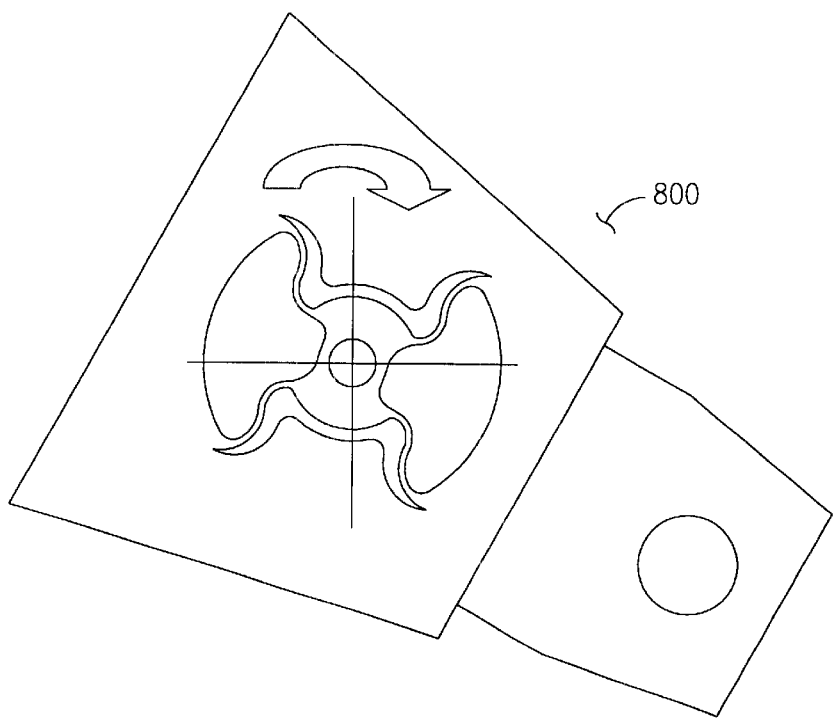
FIG. 9 shows an embodiment of the invention wherein the actuator is at an OD position.

An embodiment 600 using only flexible wings 203 without clips is shown in an actuator 603 in FIG. 7. The embodiment shows the actuator 603 approaching an ID position. The actuator 603 is also shown in the embodiment 700 of FIG. 8, here in a mid position, and in embodiment 800 of FIG. 9, here in an OD position. It will be seen that the action of the flexible wings 203 without clips is essentially identical to the action of the flexible wings 203 with the clips. It is clear that the embodiments of FIGS. 7–9 have the potential of providing a lower cost, simpler solution if the materials used in the actuator are resilient enough to provide the flexible wings 203.

In summary, the present invention can be described as an actuator with a limited range of rotation includes an actuator arm 103 for moving a transducer to read or write data to or from media. A shaft 105 is fixed within the actuator arm 103 and supports the actuator arm. There are one or more clips 201 affixed to the shaft 105, and the clips 201 include flexible wings 203 affixed to the actuator arm 103, such that the shaft 105 and the actuator arm 103 are held in an axially fixed relationship by a shape of the wings 203 of clips 201 while allowing movement between the actuator arm 103 and the shaft 105 with a range of rotation of less than 90 degrees relative to the shaft. A stopping device 205 is supported between the actuator arm 103 and the shaft 105 such that motion of the actuator arm 103 in rotation is stopped at a desired location by interference between the flexible wings 203 and the stopping device 205. The allowed range of the rotation of the actuator arm 103 is substantially plus or minus 15 degrees. The stopping device 205 is in the form of shaped blocks on the actuator arm 103 for engaging the flexible wings 203 when the rotation is up to or slightly beyond a desired limit. The flexible wings 203 can be formed as an integral part of the actuator arm 103 or can be part of the shaft 105, in which case actuator arm 103 has internal slots 206 affixing each of the wings 203 of clips 201 to the actuator arm 103. A method for actuator 100 may include an actuator arm 103 capable of rotation around a fixed shaft 105 for a limited range of rotation due to clips 201 having flexible wings 203 affixed to the actuator arm 103, whereby the shaft 105 and the actuator arm 103 are held in a fixed axial relationship while allowing the actuator arm 103 to rotate with respect to the shaft 105. This prevents movement between the actuator arm 103 and the shaft 105 other than rotation by a shape of the flexible wings 203. Rotation between the actuator arm 103 and the shaft 105 is stopped at a desired location by interference between the flexible wings 203 and the actuator arm 103. The range of rotation with respect to the shaft 105 is substantially plus or minus 15 degrees and is stopped by the flexible wings 203 engaging shaped blocks 205 when rotation is at a desired limit.

Even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangements of parts within the principles of the present invention to the full extent indicated by the broad general meaning of the terms in which the appended claims are expressed. For example, although the preferred embodiment described herein is directed to a low cost flexible support actuator, it will be appreciated by those skilled in the art that the teachings of the present invention can be applied to couple a rotatable member to other pivot points without departing from the scope and spirit of the present invention.

What is claimed is:

1. An actuator with a limited range of rotation comprises:
   an actuator arm for moving a transducer supported on it to read or write data to or from media;
   a fixed shaft within the actuator arm supporting the actuator arm for rotation about an axis of the shaft;
   at least one clip affixed to the shaft, each clip having flexible wings affixed to the actuator arm, such that the shaft and the actuator arm are held in an axially fixed relationship while permitting actuator arm to move around the shaft with a range of rotation of less than 90 degrees relative to the shaft.

2. The actuator of claim 1 further comprising:
   a stopping device supported between the actuator arm and the shaft such that motion of the actuator arm in rotation is stopped by the stopping device at a desired location by interference between the flexible wings and the stopping device.

3. The actuator of claim 2 wherein the allowed range of the rotation is substantially plus or minus 15 degrees.

4. The actuator of claim 2 wherein the stopping device is in the form of shaped blocks on the actuator arm to engage the flexible wings when the rotation is up to or slightly beyond a desired limit.

5. The actuator of claim 1 wherein flexible wings are formed as an integral part of the actuator arm.

6. The actuator of claim 1 wherein the flexible wings are a part of the shaft and the actuator arm has internal slots to receive the wings to fix each of the clips to the actuator arm.

7. An actuator for use in a disc drive, comprising:
   a fixed shaft;
   an actuator arm surrounding the shaft and, the actuator configured to support a transducer thereon; and
   at least one clip, each clip comprising:
      a main body affixed to the shaft; and
      two flexible elements, each flexible element having one end affixed to the main body and an opposite end affixed to the actuator arm.

8. The actuator of claim 7, in which the at least one clip comprises two clips.

9. The actuator of claim 7, in which the actuator is rotatable through a predetermined range of travel, and in which the range is defined by the flexible elements.

10. The actuator of claim 7, in which the actuator arm is rotatable within a horizontal plane, and in which the flexible elements are substantially rigid in a vertical direction.

11. The actuator of claim 7, in which the flexible elements comprise spring steel.

12. The actuator of claim 7, in which the flexible elements are affixed to the actuator arm by being injection molded therein.

13. The actuator of claim 7, in which the clip is integrally formed with the shaft.

14. The actuator of claim 7, in which the flexible elements are integrally formed with the main body.

15. A method for supporting an actuator arm for rotation about an axis of a fixed shaft, comprising steps of:
   a) affixing a clip having flexible wings to the shaft;
   b) affixing the flexible wings to the actuator arm; and
   c) configuring the flexible wings so they allow rotation of the actuator arm relative to the shaft while not allowing any other motion of the actuator arm relative to the shaft.

16. The method of claim 15, further including a step of:
   d) limiting a range of actuator arm rotation through interference between the flexible wings and the actuator arm.

17. The method of claim 16 in which the limited range of rotation of the actuator arm with respect to the shaft is substantially 30 degrees.

18. The method of claim 15, further including a step of:
   d) positioning shaped blocks on the actuator arm such that the blocks engage the flexible wings when rotation is at a desired limit, thereby limiting a range of actuator arm rotation.

* * * * *